United States Patent
Kim et al.

(10) Patent No.: US 10,872,511 B2
(45) Date of Patent: Dec. 22, 2020

(54) INTELLIGENT SPACE SAFETY MONITORING APPARATUS AND SYSTEM THEREOF

(71) Applicant: FS, Inc., Daejeon (KR)

(72) Inventors: Young Jin Kim, Daejeon (KR); Ki Ryung Kwon, Seoul (KR)

(73) Assignee: FS, Inc., Daejeon (KR)

( * ) Notice: Subject to any disclaimer, the term of this patent is extended or adjusted under 35 U.S.C. 154(b) by 0 days.

(21) Appl. No.: 16/535,621

(22) Filed: Aug. 8, 2019

(65) Prior Publication Data
US 2020/0051414 A1 Feb. 13, 2020

(30) Foreign Application Priority Data

Aug. 9, 2018 (KR) .......................... 10-2018-0092941

(51) Int. Cl.
- *G08B 17/117* (2006.01)
- *G08B 17/12* (2006.01)
- *G06K 9/00* (2006.01)
- *G06K 9/62* (2006.01)
- *G08B 21/02* (2006.01)

(52) U.S. Cl.
CPC ....... *G08B 17/125* (2013.01); *G06K 9/00691* (2013.01); *G06K 9/00711* (2013.01); *G06K 9/6212* (2013.01); *G08B 17/117* (2013.01); *G08B 21/02* (2013.01); *G06K 2009/00738* (2013.01)

(58) Field of Classification Search
USPC ......................................................... 348/143
See application file for complete search history.

(56) References Cited

U.S. PATENT DOCUMENTS

| | | | | |
|---|---|---|---|---|
| 4,316,229 A | * | 2/1982 | Helwig, Jr. | .............. H02H 3/33 361/42 |
| 4,831,361 A | * | 5/1989 | Kimura | .................. G08B 23/00 340/500 |
| 2005/0078854 A1 | * | 4/2005 | Shikano | ............. G06K 9/00664 382/103 |

(Continued)

FOREIGN PATENT DOCUMENTS

| | | | |
|---|---|---|---|
| KR | 10-2015-0134095 A | 12/2015 | |
| KR | 10-2016-0085033 A | 7/2016 | |

(Continued)

*Primary Examiner* — Behrooz M Senfi
(74) *Attorney, Agent, or Firm* — Paratas Law Group, PLLC (57) ABSTRACT

Disclosed is an intelligent space safety monitoring system, including: a management server for storing and outputting data, a state sensing unit disposed in a sensing space to be sensed and for transmitting a sensing value having sensed a normal state or an abnormal state within the sensing space to the management server, a sensing space photographing unit for transmitting a first screen having photographed the sensing space of the normal state as a case where the sensing value sensed by the state sensing unit is smaller than a setting value and a second screen having photographed the sensing space of the abnormal state as a case where the sensing value sensed by the state sensing unit is the setting value or more to the management server, and an abnormal state determining unit for determining the sensing space as a risk state.

15 Claims, 4 Drawing Sheets

(56) References Cited

U.S. PATENT DOCUMENTS

| | | | | |
|---|---|---|---|---|
| 2015/0302728 | A1* | 10/2015 | Gettings | G08B 3/10 340/506 |
| 2015/0330817 | A1* | 11/2015 | Law | G01N 33/0073 702/3 |
| 2016/0320085 | A1* | 11/2016 | Silawan | H04N 5/23232 |
| 2016/0328941 | A1* | 11/2016 | Sundholm | G08B 21/0469 |

FOREIGN PATENT DOCUMENTS

| KR | 10-2017-0013046 A | 2/2017 |
|---|---|---|
| KR | 10-1731171 B1 | 4/2017 |
| KR | 10-1828994 B1 | 2/2018 |

\* cited by examiner

INTELLIGENT SPACE SAFETY MONITORING APPARATUS AND SYSTEM THEREOF

CROSS-REFERENCE TO RELATED APPLICATION

This application claims priority to Korean Patent Application No. 10-2018-0092941, filed on Aug. 9, 2018, which is incorporated herein by reference in its entirety.

BACKGROUND

The present disclosure relates to an intelligent space safety monitoring apparatus and a system thereof.

As the industry grows, there is a strong need for security and fire sensing systems for large-scale complex buildings, structures, tunnels, etc., but a sensor that may be actually applied are very limited. Particularly, a flame sensor, which is useful for early fire alarm with a fast response speed, has a short sensing distance of about 50 m at maximum and there always exists a risk of malfunction. Further, a problem is also pointed out that only a sensing signal through a contact signal may be transmitted, thereby limiting the complex application expansion of the integrated monitoring, etc.

Further, a conventional fire sensor is a simple system for sensing as a fire when it is a predetermined value or more by using a sensor for sensing temperature, smoke, etc. to generate an alarm by using a lamp or other apparatus, and notifying the fire station of the occurrence of fire by using a fire reporting facility, and frequent mobilization of the fire station and the manager are caused by the frequent determination error, thereby resulting in big complaint.

In order to compensate for the drawback of such conventional fire sensor, there has recently been a system for receiving general fire sensor information from a server to determine the presence or absence of a fire, but the presence or absence of a fire is determined by simply using a sensing value of the sensor without considering industry or its environment such as a high risky place for fire of a traditional market, etc., such that the preliminary prediction is not possible at all, and the determination error of the fire is still not corrected.

Further, although the type of fire may be classified into electric fire caused by electric leakage and general fire caused by general causes except the electric fire, there is no fire sensing system for sensing by integrally distinguishing the electric fire and the general fire.

SUMMARY

The present disclosure is intended to solve the above-described problems, and an object of the present disclosure is to provide an intelligent space safety monitoring system, which may not only determine an abnormal state by setting a risk prediction level within a sensing space for each step but also set various setting values according to the usage aspect of the sensing space in determining the abnormal state, and may not only prevent the dangerous occurrence of the sensing space but also promptly response to the occurrence of risk.

An embodiment of an intelligent space safety monitoring system according to the present disclosure includes a management server for storing and outputting data, a state sensing unit disposed in an arbitrary space to be sensed (hereinafter, referred to as 'sensing space'), and for transmitting a sensing value having sensed a normal state or an abnormal state within the sensing space to the management server, a sensing space photographing unit for transmitting a first screen having photographed the sensing space of the normal state as a case where the sensing value sensed by the state sensing unit is smaller than a setting value and a second screen having photographed the sensing space of the abnormal state as a case where the sensing value sensed by the state sensing unit is the setting value or more to the management server, and an abnormal state determining unit for determining the sensing space as a risk state by comparing the first screen and the second screen when the sensing value transmitted from the state sensing unit is the setting value or more, and transmitting the risk state to a user, and the setting value is set variously according to the usage aspect of the sensing space.

Here, the sensing space photographing unit may transmit the second screen sequentially photographed to at least two of the management servers.

Further, the abnormal state determining unit may include an imaging processor for pattern-analyzing the first screen and the second screen on a pixel-to-pixel basis, and determine it as the risk state when there is a pattern change of the setting pattern value or more by the imaging processor.

Further, the state sensing unit may include a fire detecting unit disposed in the sensing space, and for detecting configuration factor information relevant to a direct fire and an environment detecting unit disposed in the sensing space, and for detecting environment factor information within the sensing space as information in addition to the configuration factor information relevant to the fire detecting unit.

Further, the abnormal state determining unit may store it in the management server by classifying the risk state of the sensing space by a rating according to the usage aspect of the sensing space, and transmit a risk state rating of the sensing space and environment factor information of the sensing space sensed by the state sensing unit to the user when the sensing value transmitted from the state sensing unit is smaller than the setting value.

Further, the fire detecting unit may include at least one of a current detector disposed at a plurality of positions of the electric wire wired in the sensing space to sense a current state, and a fire sensor for sensing a specific temperature within the sensing space or smoke within the sensing space.

Further, the current detector may sense resistive electric leakage among the leakage types of the electric wire.

Further, the abnormal state determining unit may store the risk state of the sensing space in the management server for rating according to the amount of electric leakage of the resistive current detected by the current detector.

Further, the fire sensor may sense the temperature and the amount of smoke in the sensing space.

Further, the environment detecting unit may include a humidity sensor for sensing humidity within the sensing space, a dust sensor for sensing the amount of dust, a gas sensor for sensing the amounts of carbon monoxide (CO), carbon dioxide ($CO_2$), and volatile organic compounds ($VOC_s$), and a human body sensing sensor for sensing whether the user is present therein.

Further, the state sensing unit may transmit it to the management server via at least one of wireless communication comprising WiFi, Zigbee, LoRa, NB Iot, CDMA, LTE, or general RF communication and wire communication comprising RS485, Modbus, Ethernet, or CAN communication.

Further, the first screen may be a video or an image that the sensing space photographing unit has photographed any one of the sensing space where the user is not present therein, the sensing space without using power, and the sensing space of the time zone separately set by the user without where the user is present therein.

Further, the intelligent space safety monitoring system may further include an indoor air-conditioning unit for ventilating or air-conditioning the sensing space, and the abnormal state determining unit may determine whether the indoor air-conditioning unit automatically operates for each risk state rating of the sensing space as a case where the sensing value sensed by the state sensing unit is smaller than the setting value.

Further, the abnormal state determining unit may alarm an operation of a ventilation mode operation of the indoor air-conditioning unit when the user is present within the sensing space, and automatically operate the indoor air-conditioning unit by the ventilation mode operation when the user is not present within the sensing space.

Further, the whether the user is present within the sensing space may be determined by any one of a main power off time point within the sensing space, a setting time set by the user, and whether it is sensed by the human body sensing sensor.

Further, the abnormal state determining unit may include a calibrating unit for auto-calibrating the setting value by learning a change in the environmental factor information according to the usage aspect of the sensing space based on the sensing value sensed by the state sensing unit.

An embodiment of the intelligent space safety monitoring system according to the present disclosure includes a management server for storing and outputting data, a state sensing unit disposed in an arbitrary space to be sensed (hereinafter, referred to as 'sensing space'), and for transmitting a sensing value having sensed a normal state or an abnormal state within the sensing space to the management server, a sensing space photographing unit for transmitting a first screen having photographed the sensing space of the normal state as a case where the sensing value sensed by the state sensing unit is smaller than a setting value and a second screen having photographed the sensing space of the abnormal state as a case where the sensing value sensed by the state sensing unit is the setting value or more to the management server, and an abnormal state determining unit for determining the sensing space as a risk state by comparing the first screen and the second screen when the sensing value transmitted from the state sensing unit is the setting value or more, and transmitting the risk state to a user, and the setting value is set variously according to the usage aspect of the sensing space.

According to an embodiment of the intelligent space safety monitoring system according to the present disclosure, it is possible not only to variously set the risk state rating and the setting value for determining it according to the usage aspect of the sensing space, thereby correcting frequent warning errors, etc., but also to create the environment suitable for the usage aspect of the sensing space, thereby greatly improving the user's convenience.

DETAILED DESCRIPTION

Hereinafter, some embodiments of the present disclosure will be described in detail with reference to exemplary drawings. It should be noted that, in adding reference numerals to the components of each drawing, the same components are denoted by the same reference numerals as possible even though they are shown in different drawings. Further, in the following description of the embodiments of the present disclosure, a detailed description thereof will be omitted when it is determined that a detailed description for relevant known configurations or functions obscure the understanding of the embodiments of the present disclosure.

In describing the components of the embodiments of the present disclosure, the terms such as first, second, A, B, (a), (b), etc. may be used. These terms are intended only to distinguish the components from other components, and the nature, sequence or order of the corresponding components is not limited by the terms. Further, unless otherwise defined, all terms used herein, including technical or scientific terms, have the same meaning as commonly understood by those skilled in the art to which the present disclosure pertains. Terms such as those defined in commonly used dictionaries should be construed as having the meaning consistent with the meaning in the context of the relevant art, and are not construed in an ideal or overly formal sense unless explicitly defined in the present application.

Throughout the specification, when a portion is referred to as being "comprising" or "having" a component, it means that the portion may further include another component rather than excluding another component unless specially stated otherwise.

Figure 1:
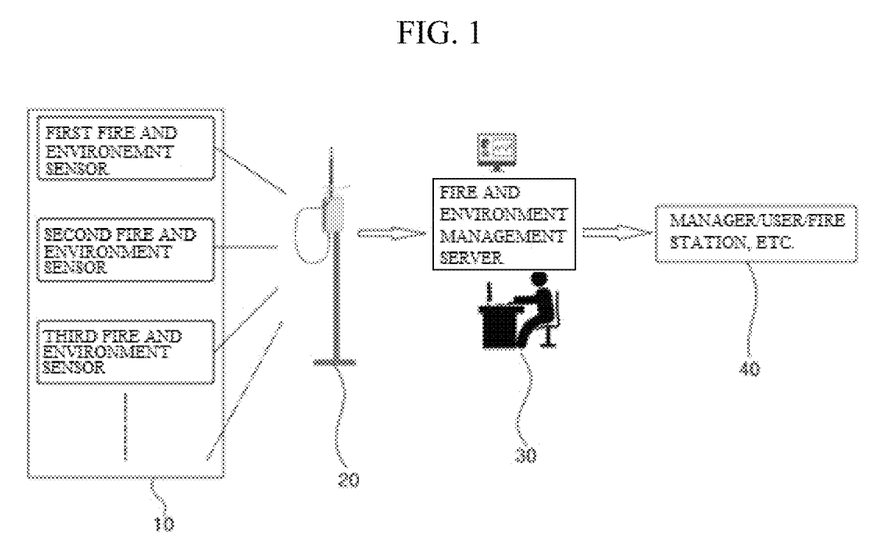
FIG. 1 is a system diagram showing an embodiment of an intelligent space safety monitoring system according to the present disclosure.
Figure 2:
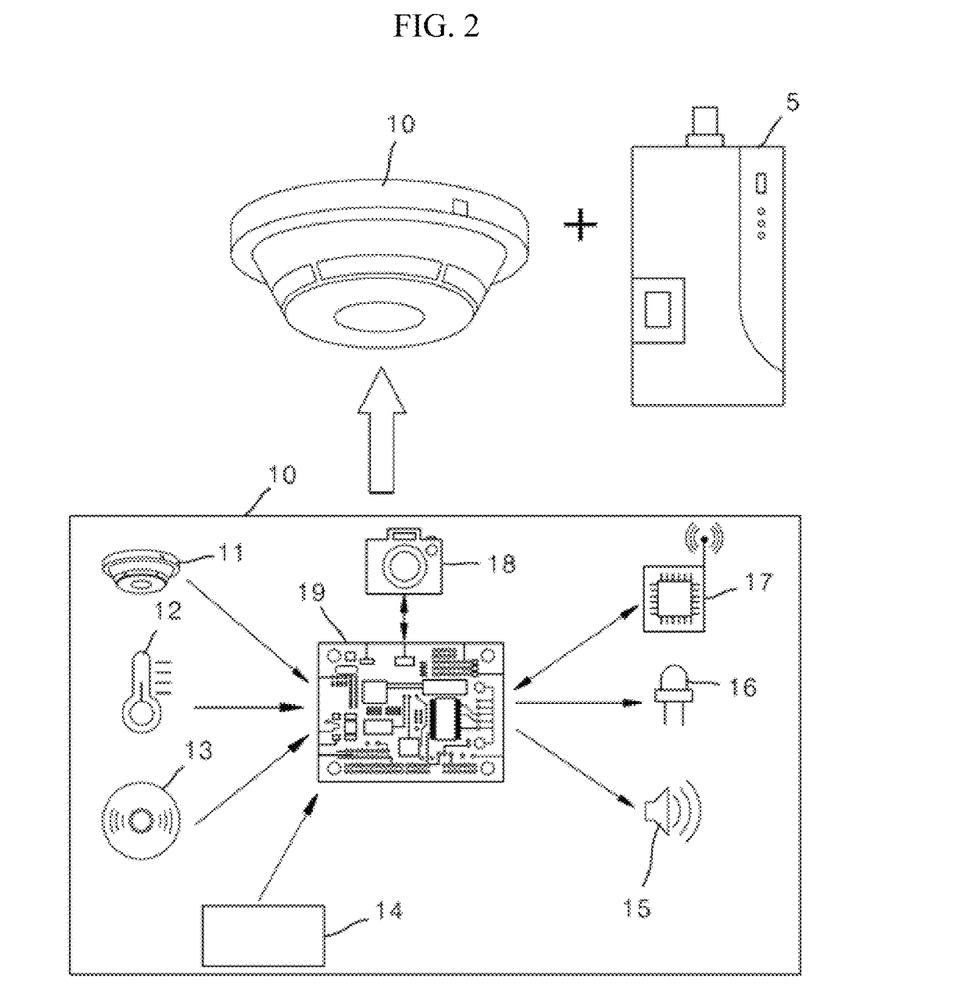
FIG. 2 is a schematic diagram showing a configuration of a fire detecting unit in the configuration of FIG. 1.

FIG. 1 is a system diagram showing an embodiment of an intelligent space safety monitoring system according to the present disclosure, and FIG. 2 is a schematic diagram showing a configuration of a fire detecting unit in the configuration of FIG. 1.

As shown in FIGS. 1 and 2, an embodiment of an intelligent space safety monitoring system according to the present disclosure is disposed in an arbitrary space (hereinafter, referred to as 'sensing space'), and includes a state sensing unit 10 for sensing a normal state and an abnormal state within the sensing space.

The state sensing unit 10 may sense configuration factor information or environmental factor information within the sensing space described in detail below.

Here, the configuration factor information refers to information about a factor that may directly cause a fire within the sensing space. For example, the configuration factor may be temperature (change) and the amount of smoke within the sensing space normally generated in a fire. Further, the electric leakage state of the electric wire may also be evaluated as a direct factor related to the fire. That is, the configuration factor information is a factor within the sensing space, and may be defined as a factor capable of providing an indicator that the inside of the sensing space may be evaluated as a fire.

Further, the environmental factor information is information other than the above-described configuration factor information, and is information on the normal air quality state within the sensing space. For example, the environmental factor within the sensing space may include temperature, humidity, the amount of dust and the amounts of carbon monoxide (CO), carbon dioxide ($CO_2$), and volatile organic compounds ($VOC_s$) within the sensing space. Further, the environmental factor may also include whether a user is present within the sensing space. Such environmental factor information may be generally defined as air quality information within the sensing space, in the case of the remaining factors except for whether the user is present therein.

The state sensing unit 10 may periodically sense the configuration factor information and the environmental factor information to provide an objective indicator value for allowing an abnormal state determining unit 30 described later to determine whether there is abnormal within the sensing space.

As shown in FIG. 2, the state sensing unit 10 may include a fire detecting unit disposed in the sensing space and for detecting the configuration factor information, and an environment detecting unit disposed in the sensing space and for detecting the environmental factor information.

In particular, the fire detecting unit may include at least one of a current detector 5 disposed at a plurality of positions of the electric wire wired in the sensing space to sense a current state, and a fire sensor for sensing a specific temperature within the sensing space or smoke within the sensing space.

The fire detecting unit implemented by the current detector may sense resistive electric leakage among the types of electric leakage of the electric wire. As already well known, this is because the electric leakage of the electric wire is classified into resistive electric leakage and capacitive electric leakage, but among them, the electric leakage that causes the fire is the resistive electric leakage. That is, the resistive electric leakage may cause fire and various electric accidents because the conductor is also changed in the insulator due to the carbonization of the terminal connection portion due to the use time and aging of the equipment.

Meanwhile, the fire detecting unit may include a smoke sensor 11 for sensing smoke within the sensing space, a temperature sensor 12 for sensing temperature within the sensing space, a humidity sensor 14 for sensing humidity within the sensing space, a dust sensor for sensing the amount of dust, a gas sensor 13 for sensing the amounts of carbon monoxide (CO), carbon dioxide ($CO_2$), and volatile organic compounds ($VOC_s$), and a human body sensing sensor (not shown) for sensing whether a user is present therein.

In an embodiment of the intelligent space safety monitoring system according to the present disclosure, the state sensing unit 10 has been classified into the fire detecting unit and the environment detecting unit for individual control according to the usage aspect of the sensing space. However, as shown in FIG. 2, in the fire detecting unit installed in the sensing space, the remaining components except for the current detector 5 for sensing the electric leakage of the electric wire may also be actually installed sensor-intensively in a single case.

That is, as shown in FIG. 2, the fire sensor in the fire detecting unit may include the smoke sensor 11, the temperature sensor 12, the humidity sensor 14, the dust sensor, the gas sensor 13, the human body sensing sensor, and a control module 19 for controlling the sensors within the case. Further, a communication module 17 for transmitting it from the control module 19 to a management server described later upon occurrence of the fire, a LED lamp 16 for alarming outside in a predetermined light form, and an alarm speaker 15 for alarming outside in the form of sound or voice may be further provided within the case.

Of course, it is natural that only the temperature sensor 12 and the smoke sensor 11 for directly sensing the fire may be provided within the case of the fire sensor, and the remaining sensors and components may be installed in proper positions within the sensing space as separate components.

As shown in FIGS. 1 and 2, the sensing values of the state sensing unit 10 sensed by the respective sensors may be transmitted to the abnormal state determining unit 30 through the communication module 17 in a wired or wireless form via a gateway.

Figure 3:
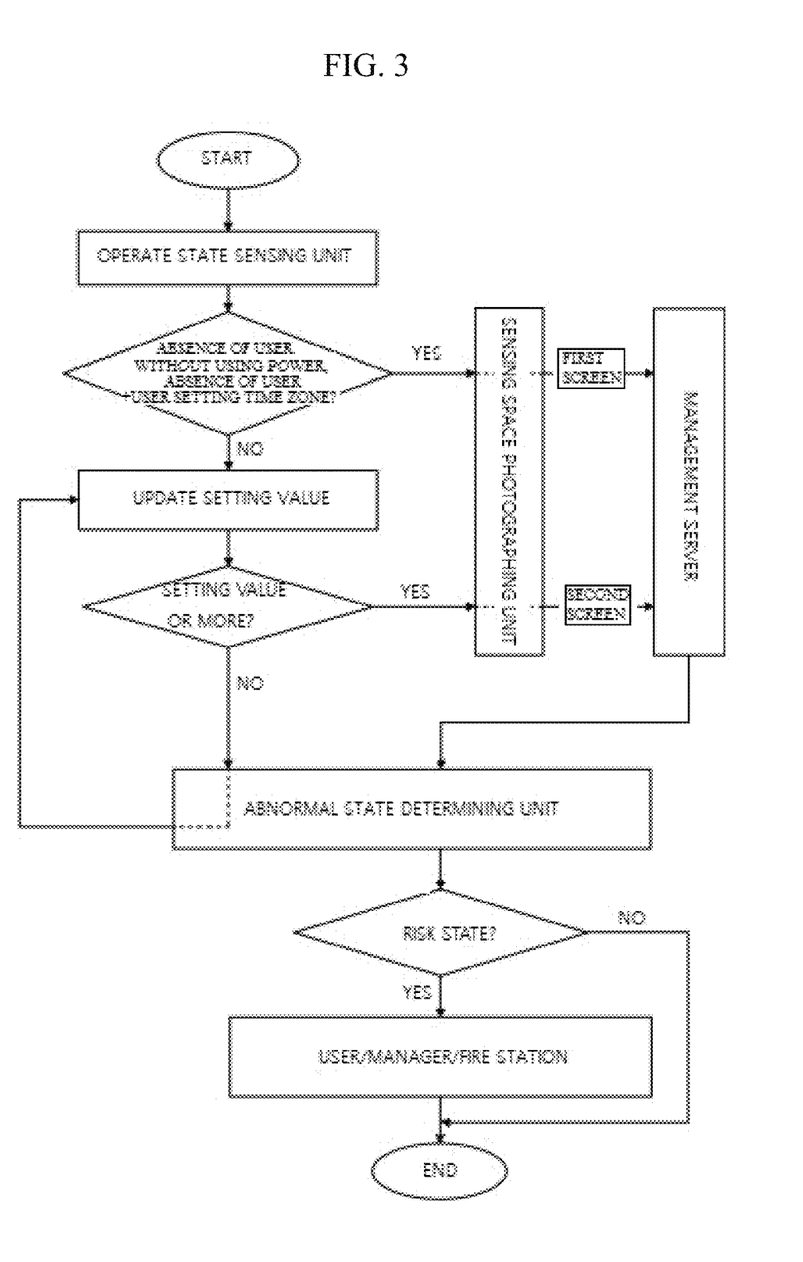
FIG. 3 is a flowchart showing an embodiment of the intelligent space safety monitoring system according to the present disclosure, and an operation diagram upon sensing fire within the sensing space.
Figure 4:
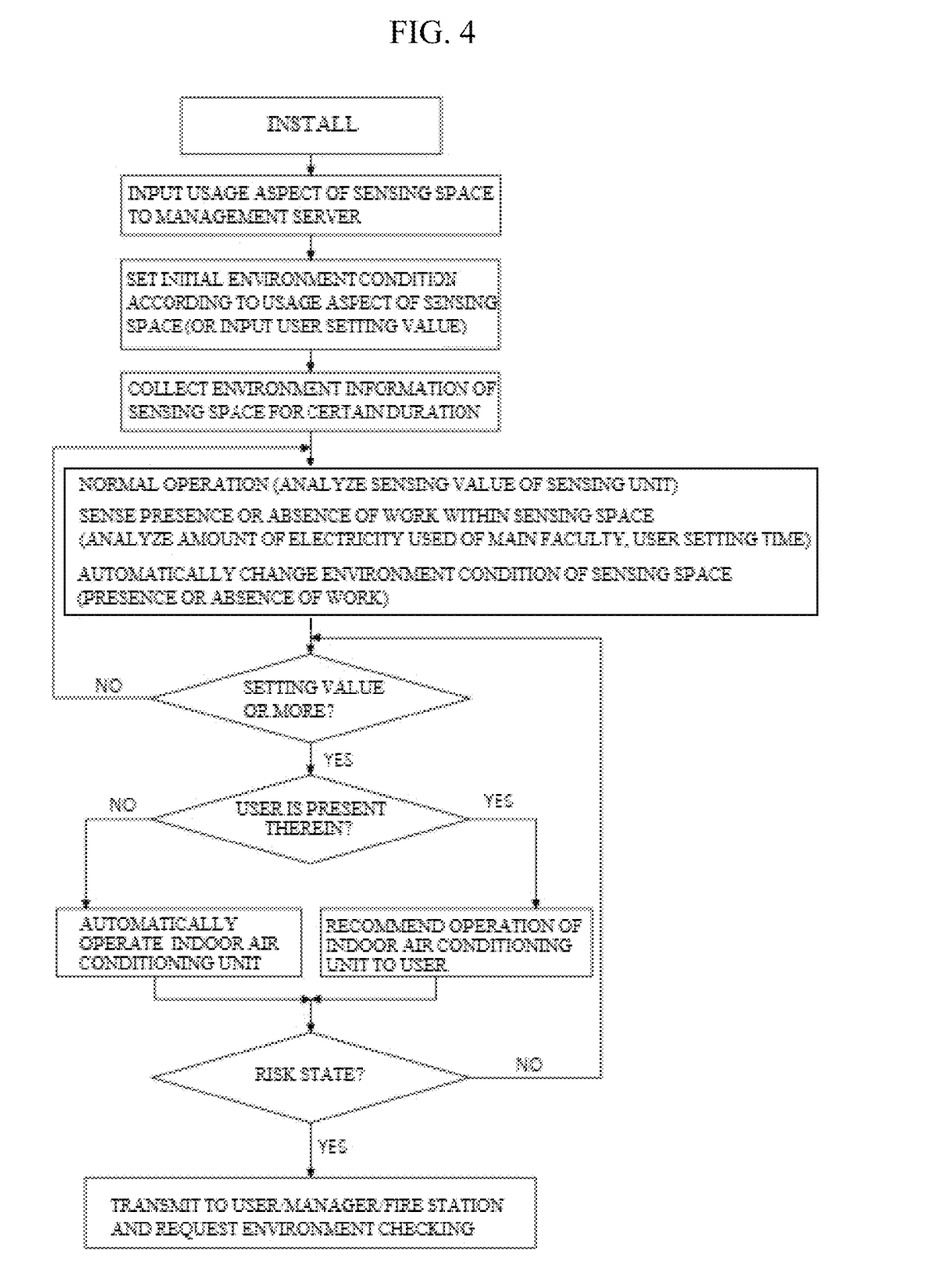
FIG. 4 is a flowchart showing an embodiment of the intelligent space safety monitoring system according to the present disclosure, and an operation diagram according to the usage aspect of the sensing space.

FIG. 3 is a flowchart showing an embodiment of the intelligent space safety monitoring system according to the present disclosure, and an operation diagram upon sensing fire within the sensing space, and FIG. 4 is a flowchart showing an embodiment of the intelligent space safety monitoring system according to the present disclosure, and an operation diagram according to the usage aspect of the sensing space.

As shown in FIGS. 3 and 4, an embodiment of the intelligent space safety monitoring system according to the present disclosure may further include a management server for storing and outputting data, a sensing space photographing unit 18 for transmitting a first screen having photographed the sensing space of a normal state when the sensing value sensed by the state sensing unit 10 is smaller than a setting value and a second screen having photographed the sensing space of an abnormal state when the sensing value sensed by the state sensing unit 10 is the setting value or more to the management server, and the abnormal state determining unit 30 for determining the sensing space as a risk state by comparing the first screen with the second screen when the sensing value transmitted from the state sensing unit 10 is the setting value or more, and transmitting the risk state to a user 40.

Here, the abnormal state determining unit 30 may perform a function of determining whether there is abnormal within the sensing space, a function of variously setting the setting value as a reference of the determination according to the usage aspect of the sensing space, and a function of transmitting it to the user 40 when it is determined that the sensing space is an abnormal state.

First, the determining whether there is abnormal within the sensing space may determine the risk state of a current sensing space by comparing the sensing values periodically transmitted from the state sensing unit 10 with the setting value that has been previously set to be suitable for the sensing space to compare and analyze the first screen and the second screen transmitted from the sensing space photographing unit 18 as the case where it is the setting value or more.

More specifically, the abnormal state determining unit 30 may set the setting value suitable for the usage aspect of the sensing space in advance. For example, in the case where the sensing space is a kitchen of a restaurant and a general office, the temperatures within the sensing space sensed by the state sensing unit 10 are basically different, such that the setting value may be set in temperature higher in the kitchen of the restaurant than in the general office.

Further, the abnormal state determining unit 30 may store the sensing value sensed by the state sensing unit 10 transmitted therefrom in the management server, and determine a current risk level by comparing the sensing value with the setting value.

Here, the abnormal state determining unit 30 may classify the risk state of the sensing space according to the usage aspect of the sensing space by a rating to store it in the management server, and transmit to the user 40 the risk state rating of the sensing space and the environmental factor information of the sensing space sensed by the state sensing unit 10 even when it is smaller than the setting value by comparing the sensing value transmitted from the state sensing unit 10 with the setting value.

Further, the abnormal state determining unit 30 may include a calibrating unit for auto-calibrating the setting value by learning the variation of the environmental factor information according to the usage aspect of the sensing space based on the sensing value sensed by the state sensing unit 10.

For example, in the case where the sensing space is the kitchen of the restaurant, for the temperature or smoke of the sensing space sensed by the state sensing unit 10, it is necessary to set the setting value to a high value in a time zone when the customer is the most, while it is necessary to set the setting value to a low value in a time zone when the customer is less.

As described above, although not exemplified for each time zone, the calibrating unit may perform functions of learning the usage aspect of the sensing space based on the sensing value sensed by the state sensing unit 10 variously for each space, and setting a new setting value under a certain condition based on the above.

According to such a calibrating unit, in the case where the sensing space is the kitchen of the restaurant, the setting value is set to be relatively higher in the time zone when the customer is the most than in the time zone when the customer is less and at the same time, the risk state rating for each sensing space sensed by the abnormal state determining unit 30 may also be upgraded, while the setting value is set to be relatively lower in the time zone when the customer is less and at the same time, the risk state rating may also be downgraded.

Meanwhile, the first screen and the second screen transmitted by the sensing space photographing unit 18 may be defined to be classified as follows.

The first screen is a case where the sensing space is in so-called 'normal state', and may be a video or an image in which the sensing space photographing unit 18 has photographed any one of the sensing space of a state where the user has not been present therein, the sensing space without using power, or the sensing space of the time zone previously set separately by the user while the user is not present therein. That is, the first screen may be the initial data of the normal state to be compared with the second screen described later.

Further, the second screen is a case where the sensing value sensed by the state sensing unit 10 is the setting value or more, and may be a comparison video or an image for finally determining the risk state by comparing it with the first screen by the abnormal state determining unit 30. The sensing space photographing unit 18 may transmit at least two of the second screens sequentially photographed to the management server so as to be objective reference data.

Here, the abnormal state determining unit 30 may further include an imaging processor for pattern-analyzing the first screen and the second screen on a pixel-by-pixel basis. The image processor pattern-analyzes the first screen and the second screen to determine the sensing space as the risk state such as a fire when there is a pattern change of the setting pattern value or more.

That is, as shown in FIG. 3, when the sensing value sensed by the state sensing unit 10 is the setting value or more, the abnormal state determining unit 30 may determine the risk state through the pattern analysis of each screen by the image processor by brining the first screen stored in the management server, if at least two of the second screens are transmitted from the sensing space photographing unit 18.

When the current state of the sensing space is determined as the risk state such as a fire by the abnormal state determining unit 30, the abnormal state determining unit 30 may transmit the risk state of the sensing space to the user, the manager or the governmental fire station responsible for a fire (hereinafter, referred to as 'user, etc. 40'), and transmit the above-described first screen and second screen together.

When receiving an alarm on the risk state of the sensing space from the abnormal state determining unit 30, the user, etc. 40 may accurately analyze the risk state of the current sensing space based on the first screen and the second screen, and response to and check the rapid risk removal.

Meanwhile, as shown in FIGS. 3 and 4, the abnormal state determining unit 30 may change and set the setting value based on the sensing value of the environmental detecting unit for sensing the environmental factor information directly irrelevant to a fire in the state sensing unit 10 from time to time.

For example, the abnormal state determining unit 30 may set and update the setting value and the risk state rating variously according to whether the user is present in the sensing space and the suitable usage environment, thereby correcting frequent errors of the conventional fire determination.

That is, when the sensing value sensed by the state sensing unit 10 is later less than the newly updated setting value, the sensing space is not in the risk state, but the abnormal state determining unit 30 may reset by classifying the risk step of the sensing space by a rating as a preliminary step before the risk level, and transmit a current risk step to the user in advance to provide information so that the user prevents and responses to the risk of the sensing space.

Further, as shown in FIG. 4, the intelligent space safety monitoring system according to the present disclosure may further include an indoor air conditioning unit for ventilating or air-conditioning the sensing space.

Here, the indoor air conditioning unit may be provided as an air conditioner capable of ventilating the indoor air or cooling or heating the indoor. The air conditioner for home use, for office use, or for business use may be all included in the indoor air conditioning unit of the present disclosure as long as they perform the function of the air conditioner.

The abnormal state determining unit 30 may input and store the business type information of the sensing space in the management server in advance. Here, the business type information may be set variously according to the usage aspect of the sensing space, and may be an air environment condition or a user setting condition suitable for the sensing space.

Meanwhile, the state sensing unit 10 may collect the environmental information of the sensing space for certain duration. At this time, the abnormal state determining unit 30 may change the stored air environment condition or user setting condition of the sensing space based on the environment information sensed by the state sensing unit 10. For example, it is possible to change the air environment condition or the user setting condition to be different according to the presence or absence of work within the sensing space.

In this state, when the sensing value of the sensing space sensed by the state sensing unit 10 is smaller than the setting value, the state sensing unit 10 may continuously sense various factors of the sensing space, and when it is the setting value or more, the state sensing unit 10 may confirm whether the user is present within the sensing space.

When the user is present therein, it may recommend the user so that the user operates the indoor air conditioning unit in various forms such as an operation of the speaker 15 or the lamp 16. Of course, even when the user is present therein, the abnormal state determining unit 30 may automatically operate the indoor air conditioning unit in a direction to lower the risk state rating.

An operation example of the indoor air conditioning unit that lowers the risk state rating may be a rapid ventilation mode operation of the indoor air conditioning unit for discharging the smoke within the sensing space.

If it is determined as the risk state as a case where the sensing space determined by the abnormal state determining unit 30 exceeds the setting value, as described above, it is possible to alarm the risk state to the user, etc. 40, and to request the environment checking. If it is not risk state as a case where the sensing space determined by the abnormal state determining unit 30 exceeds the setting value, it is possible to compare the sensing value of the state sensing unit 10 again or to update the setting value according the usage aspect of the sensing space.

As described above, an embodiment of the intelligent space safety monitoring system according to the present disclosure has been described in detail with reference to the accompanying drawings. However, it is natural that an embodiment of the present disclosure is not necessarily limited to the above-described embodiment, and various modifications and practices within the equivalent range may be made by those skilled in the art to which the present disclosure pertains. Accordingly, it is apparent that the true scope of the present disclosure is defined by the appended claims.

What is claimed is:

1. An intelligent space safety monitoring system, comprising:
   a management server for storing and outputting data;
   a state sensing unit, disposed in an arbitrary sensing space, being configured to sense a normal state or an abnormal state within the sensing space and transmit a sensing value to the management server;
   a sensing space photographing unit configured to transmit to the management server a first screen obtained by photographing the sensing space in the normal state in which the sensing value sensed by the state sensing unit is smaller than a setting value and a second screen obtained by photographing the sensing space in the abnormal state in which the sensing value sensed by the state sensing unit is equal to or bigger than the setting value; and
   an abnormal state determining unit configured to, by comparing the first screen and the second screen, determine the sensing space as in a risk state when the sensing value transmitted from the state sensing unit is equal to or bigger than the setting value, and transmit the risk state to a user,
   wherein the abnormal state determining unit is configured to classify the risk state of the sensing space by a rating according to utility of the sensing space and store a risk state rating of the sensing space, which is classified by the utility of the sensing space, in the management server,
   wherein the abnormal state determining unit is further configured to transmit the risk state rating of the sensing space and environmental factor information of the sensing space sensed by the state sensing unit to the user when the sensing value transmitted from the state sensing unit is smaller than the setting value, and
   wherein the setting value is set differently according to the utility of the sensing space.

2. The intelligent space safety monitoring system of claim 1, wherein the sensing space photographing unit is configured to transmit the second screen sequentially photographed to at least two management servers.

3. The intelligent space safety monitoring system of claim 1, wherein the abnormal state determining unit comprises an imaging processor configured to pattern-analyze the first screen and the second screen on a pixel-to-pixel basis, and
   wherein the abnormal state determining is configured to determine the sensing space as in the risk state when the imaging processor analyzes that a pattern change is equal to or bigger than the setting value.

4. The intelligent space safety monitoring system of claim 1, wherein the state sensing unit comprises:
   a fire detecting unit, disposed in the sensing space, being configured to detect configuration factor information relevant to a direct fire; and
   an environment detecting unit, disposed in the sensing space, being configured to detect environment factor information within the sensing space as information in addition to the configuration factor information relevant to the fire detecting unit.

5. The intelligent space safety monitoring system of claim 1, wherein the fire detecting unit comprises at least one of a current detector disposed at a plurality of positions of an electric wire wired in the sensing space to sense a current state, and a fire sensor for sensing a temperature or smoke within the sensing space.

6. The intelligent space safety monitoring system of claim 5, wherein the current detector is configured to sense resistive electric leakage among the leakage types of the electric wire.

7. The intelligent space safety monitoring system of claim 6, wherein the abnormal state determining unit is further configured to store the risk state of the sensing space in the management server by a rating according to an amount of electric leakage of the resistive current detected by the current detector.

8. The intelligent space safety monitoring system of claim 5, wherein the fire sensor is configured to sense the temperature and an amount of smoke in the sensing space.

9. The intelligent space safety monitoring system of claim 1, wherein the environment detecting unit comprises:
   a humidity sensor configured to sense humidity within the sensing space;
   a dust sensor configured to sense an amount of dust;
   a gas sensor configured to sense amounts of carbon monoxide (CO), carbon dioxide ($CO_2$), and volatile organic compounds ($VOC_s$); and
   a human body sensing sensor configured to sense whether the user is present therein.

10. The intelligent space safety monitoring system of claim 4, wherein the state sensing unit is configured to transmit the sensing value to the management server via at least one of wireless communication comprising WiFi, Zigbee, LoRa, NB lot, CDMA, LTE, or general RF communication and wire communication comprising RS485, Modbus, Ethernet, or CAN communication.

11. The intelligent space safety monitoring system of claim 1, wherein the first screen includes a video or an image that the sensing space photographing unit has obtained by photographing i) the sensing space when the user is not present in the sensing space, ii) the sensing space in which power is not used, or iii) the sensing space being in a time zone set by the user and when the user is not present in the sensing space.

12. The intelligent space safety monitoring system of claim 9, further comprising an indoor air-conditioning unit configured to ventilate or air-condition the sensing space,
wherein the abnormal state determining unit is configured to determine whether the indoor air-conditioning unit automatically operates for each risk state rating of the sensing space when the sensing value sensed by the state sensing unit is smaller than the setting value.

13. The intelligent space safety monitoring system of claim 12, wherein the abnormal state determining unit is configured to alarm an operation of a ventilation mode operation of the indoor air-conditioning unit when the user is present within the sensing space, and
wherein the system is configured to automatically operate the indoor air-conditioning unit by the ventilation mode operation when the user is not present within the sensing space.

14. The intelligent space safety monitoring system of claim 13, wherein the abnormal state determining unit is configured to determine whether the user is present within the sensing space by any one of a main power off time point within the sensing space, a setting time set by the user, and sensing by the human body sensing sensor.

15. The intelligent space safety monitoring system of claim 1, wherein the abnormal state determining unit comprises a calibrating unit configured to auto-calibrate the setting value by learning a change in the environmental factor information according to the utility of the sensing space based on the sensing value sensed by the state sensing unit.

* * * * *